(12) United States Patent  
Krishnamurthy (10) Patent No.: US 9,058,624 B1
(45) Date of Patent: Jun. 16, 2015

(54) MESSAGE SHOPPING OVER AN ELECTRONIC MARKETPLACE

(75) Inventor: Karthik Krishnamurthy, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 635 days.

(21) Appl. No.: 13/312,295

(22) Filed: Dec. 6, 2011

(51) Int. Cl.
*G06Q 30/00* (2012.01)
*G06Q 30/06* (2012.01)

(52) U.S. Cl.
CPC .................................. *G06Q 30/0633* (2013.01)

(58) Field of Classification Search
CPC .................................. G06Q 30/0601–30/0645
USPC .................................................. 705/26.1–27.2
See application file for complete search history.

(56) References Cited

U.S. PATENT DOCUMENTS

| 2001/0032113 A1* | 10/2001 | Rudnick .......................... 705/8 |
| 2009/0012878 A1* | 1/2009 | Tedesco et al. ................. 705/27 |
| 2009/0106127 A1* | 4/2009 | Purdy et al. ..................... 705/27 |

OTHER PUBLICATIONS

Net-based services promote sun product—online product info facilitates purchasing decisions. (1996). Electronic Buyers' News,, 48.*

* cited by examiner

*Primary Examiner* — Resha Desai
(74) *Attorney, Agent, or Firm* — Thomas Horstemeyer, LLP (57) ABSTRACT

Disclosed are various embodiments for shopping using a messaging system. A message from a user, such as an email message, is stored in a memory for processing. The email message includes a plurality of line items. At least one item may be identified corresponding to each one of the plurality of line items by searching an electronic catalog associated with an electronic commerce system. At least one item is available for purchase through the electronic commerce system. The at least one item may be included in a list associated with a user account for the user. The user account is managed by the electronic commerce system. Further embodiments include automatically transmitting a reply email message to the user indicating that at least one item has been included in the list if the attempt to identify is successful.

21 Claims, 5 Drawing Sheets

MESSAGE SHOPPING OVER AN ELECTRONIC MARKETPLACE

BACKGROUND

An electronic marketplace allows a multitude of merchants to sell items through a common network site. Customers access the electronic marketplace by browsing through webpages powered by an electronic commerce system. Customers who wish to purchase many products will often spend more time browsing websites as the number of products they wish to purchase increases.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to reducing the burden customers face when searching for items to purchase in an electronic marketplace. Various embodiments of the present disclosure seek to provide customers with a simple and efficient way to shop for items sold in an electronic marketplace. Through the use of electronic messages, such as email, Short Message Service (SMS) text messages, and instant messages, or any other electronic message of the like, customers may shop for a multitude of items without extensive interaction with an electronic commerce system. In the following discussion, a general description of the system and its components is provided, followed by a discussion of the operation of the same.

Figure 1:
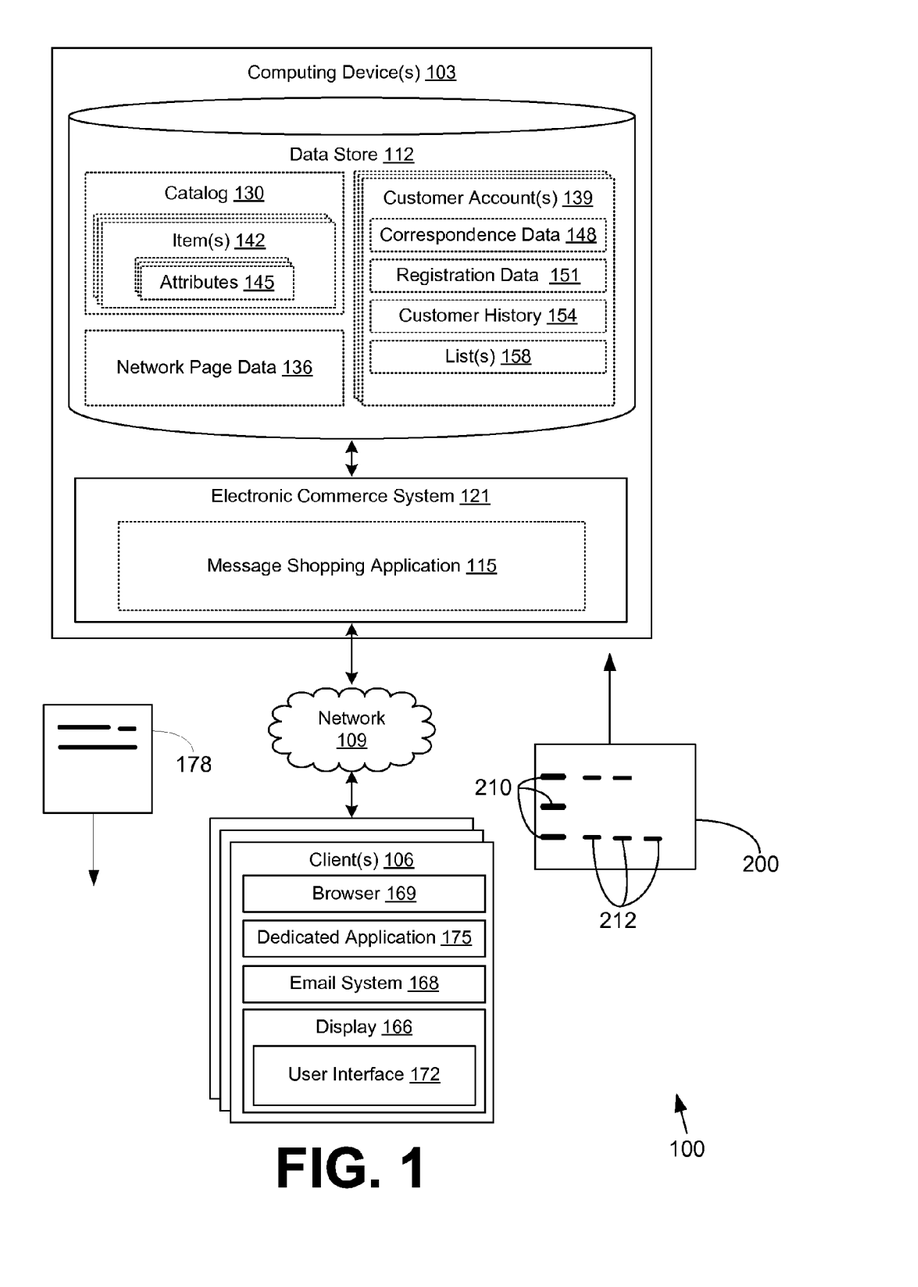
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce system 121, and other applications, services, processes, systems, engines, or functionality not discussed in detail herein. The electronic commerce system may include a message shopping application 115. Although the message shopping application 115 and the electronic commerce system 121 are described as distinct programs, it is understood that the functionality involved may be structured in a variety of ways involving any number of programs and applications.

The electronic commerce system 121 may be an application that is executed in order to facilitate the online purchase of items in the electronic marketplace over the network 109. The electronic commerce system 121 also performs various backend functions associated with the online presence of an electronic marketplace in order to facilitate the online purchase of items as will be described. For example, the electronic commerce system 121 assists in providing web pages, application content, and/or other types of network content that are provided to clients 106 for the purposes of promoting and selecting items for purchase, rental, download, lease, or any other forms of consumption.

The message shopping application 115 is executed as part of the electronic commerce system 121 to facilitate online shopping using electronic messages 200. Thus, the message shopping application 115 can be executed to expand the functionality of the electronic commerce system 121.

The data stored in the data store 112 includes, for example, a catalog 130, network page data 136, data relating to each customer account 139, and potentially other data. The catalog 130 includes a plurality of items 142 offered by a multitude of sellers through an electronic marketplace. An item 142 may refer to a product, good, service, software download, multimedia download, social networking profile, or any combination, bundle, or package thereof, that may be offered for sale, purchase, rental, lease, download, and/or any other form of consumption as may be appreciated. The various items 142 stored in the catalog 130 may each include one or more attributes 145. Various attributes may correspond to each item 142 such that an item 142 can be described and/or identified by its corresponding attributes 145. Attributes 145, for example, include titles, descriptions, quantities, conditions, images, options, weights, customer reviews, customer ratings, keywords, shipping restrictions, prices, tax classifications, unique identifiers, product or model numbers, Stock-keeping-unit (SKU) numbers, Universal Product Codes (UPCs), International Standard Book Numbers (ISBNs), color, size, brand and any other data related to items 142.

The customer accounts 139 include various data associated with customers, buyers, or users in the electronic marketplace. Each customer account 139 may correspond to a different customer within the electronic marketplace. To this end, each customer account 139 may include, for example, correspondence data 148, registration data 151, customer history 154, one or more lists 158, and/or other data. The correspondence data 148 may include records of electronic messages for each registered customer. This may entail storing electronic messages sent to or received from each customer with a customer account. Registration data 151 may include personal customer information for each customer. For example, personal customer information may include email addresses, phone numbers, shipping addresses, billing addresses, payment instrument information, passwords, and/or other information. Customer history 154 may include data relating to a customer's shopping patterns, purchase history, browse history, items removed, and so on. Each of the lists 158 may be a list of items 142 selected for a customer by the electronic commerce system 121. A list 158, for example, may be a shopping list, a wish list, a registry list, or any other list used by a customer to track a potential purchase of items.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smart phones, set-top boxes, music players, web pads, tablet computer systems, game consoles, electronic book readers, or other devices with like capability. The client 106 may include a display 166. The display 166 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 169, a dedicated application 175, an email system 168, and/or other applications. The browser 169 may be executed in a client 106, for example, to display content in a user interface 172, such as web pages, or other network content served up by the computing device 103 and/or other servers, thereby generating a rendered network page on the display 166. Likewise, a dedicated application 175 executed in a client 106 may present network content for display using a user interface 172. Additionally, the email application may also be executed within the client, for example, to facilitate sending and receiving email messages over the network 109. Furthermore, the browser 169 may work in conjunction with the email system 168 to effectuate the functionality of the email system 168. The client 106 may be configured to execute applications beyond the browser 169 and the email application such as, for example, instant message applications, and/or other applications.

The networked environment 100 may also include an electronic message 200. The electronic message may be sent to a computing device 103 from one or more clients 106 over the network 109. The electronic commerce system 121 may be configured to receive the electronic message 200 for processing. The electronic message may include one or more line items 210. Each line item 210 may represent an item 142 that a customer desires to purchase. Furthermore, each line item 210 may include one or more user-specified attributes 212. A customer may describe a desired item 142 using various user-specified attributes 212 to assist the electronic commerce system in identifying an item 142 to include in a list 158. The networked environment 100 may further include a reply message 178 that is generated by an electronic commerce system 121. The reply message may be sent to a client 106 over the network 109.

Next, a general description of the operation of the various components of the networked environment 100 is provided. To begin, the electronic commerce system 121 may be executed to facilitate the online purchase of items 142 from an electronic market place over a network 109. The electronic commerce system 121 may be an application including various modules and components to assist customers to purchase items 142 over the network 109. The message shopping application 115 may be executed as part of the electronic commerce system 121. By employing the message shopping application 115, the electronic commerce system 121 can extend its functionality with respect to facilitating online purchases of items 142.

In various embodiments the message shopping application 115 may be executed periodically or in response to an event. One such event may be receiving a particular electronic message 200 from a user. For example, a user may send an electronic message 200 over the network 109 to use the message shopping application 115. This would trigger the execution of the message shopping application 115.

Customers are typically registered within an electronic commerce system 121 prior to making transactions over the electronic marketplace. This may involve providing the customer with a customer account 139. A customer may be any user of the electronic commerce system 121. The electronic commerce system 121 may provide the customer with a user name and password. This information may be stored as registration data 151 within the respective customer account 139. Additionally, the electronic commerce system 121 may associate an email address of the customer with the customer account. In an alternate embodiment, the electronic commerce system 121 may associate a phone number of the customer with the customer account 139. In any case, the electronic commerce system 121 may use an email address, user name, or phone number to verify or authenticate the customer's identity when a customer attempts to access the electronic commerce system 121.

The message shopping application 115 is configured to process an electronic message 200 received from a customer. An electronic message 200 may be an email message, a Short Message Service (SMS) text message, an instant message, or anything of the like. In one embodiment, the electronic message 200 is stored in memory. Specifically, the electronic message 200 may be stored as correspondence data within a data store 112. In one example of the present disclosure, all electronic messages 200 received from a particular customer may be stored in a customer account 139 for the customer.

Processing the electronic message 200 may also include validating the electronic message 200. For example, if the electronic message 200 is an email, then the message shopping application 115 can verify if the email address of a sender matches an email address belonging to a customer. Moreover, the message shopping application 115 may be configured to access registration data 151 within a customer account 139 where registration data 151 may include the email address of a customer. Thus, by looking at the email address of a sender, which is part of the email message subject to processing, the message shopping application 115 can identify the customer by referencing the registration data 151 stored in the data store 112. Similarly, if the electronic message 200 is an SMS text message, the message shopping application 115 can use the sender's phone number to identify the customer by referencing the customer's registration data 151. Thus, verification is complete upon identifying the customer based on sender information associated with the electronic message 200.

An electronic message 200 received by the message shopping application 115 may include one or more line items 210. A line item 210 may represent a desired item 142 that a customer wishes to purchase. Specifically, the customer describes the desired item 142 as a line item 210 within the electronic message 200. The message shopping application 115 may identify each line item 210 included within a received electronic message 200. This may involve performing various text string functions to extract and parse each line item 210. The message shopping application 115 may store in memory each line item 210 included in a particular electronic message 200. In one embodiment of the present disclosure, each electronic message 200 received from a customer is stored as correspondence data 148 in a customer account 139 for the customer.

Next, the electronic commerce system 121 may identify an item 142 for each line item 210 in the electronic message 200. The electronic commerce system 121 may access data stored in data store 112 to make this determination. For example, the electronic commerce system 121 may search throughout a catalog 130, which is managed by the electronic commerce system 121. Here, the electronic commerce system 121 may match an item 142 within the catalog 130 to a particular line item 210 of the received electronic message 200. Additionally, the electronic commerce system 121 may find an item 142 associated with a merchant who is offering the best offer. When the electronic commerce system 121 identifies at least one item 142 for each line item 210, the electronic commerce system 121 may include one or more items 142 in a list 158 associated with a customer account 139 for the customer. In one embodiment of the present disclosure, the electronic commerce system 121 first generates the list 158 and then includes the identified items 142 in the list 158. In another embodiment, the electronic commerce system 121 includes the identified items 142 in a list 158 by updating a previously existing list. For example, a customer may send subsequent electronic messages to the electronic commerce system 121 to update the list 158.

The message shopping application 115 is configured to generate a reply message 178 to send to the customer. The reply message 178, for example, may be an email, a Short Message Service (SMS) text message, an instant message or any other electronic message of the like. The reply message 178 may include information relating to the status of one of the lists 158. For example, if no items 142 were identified by the electronic commerce system 121 for the line items 210 in the electronic message 200, then the reply message 178 may indicate this result. Similarly, if one or more items 142 were identified by the electronic commerce system 121, then the reply message 178 can confirm that such items 142 have been included in one of the lists 158 in the customer account 139 for the customer. In one embodiment of the present disclosure, the reply message 178 may include a link for directing the user to one of the lists 158. In this case, the contents of the list 158 may be expressed to the customer using a user interface 172. In one example, the link included in the reply message 178 will provide access to a network page that includes the list 158. Furthermore, the network page is displayed in the user interface 172 by using a browser 169. In another example, a dedicated application 175 is executed in the client 106 for rendering one or more lists 158 in the user interface 172.

The message shopping application 115 may automatically transmit the reply message 178 to the customer. Through the use of a client 106, a customer can receive the reply message 178. In the case where the reply message 178 is an email message, the customer can use an email system 168 to receive the reply message 178. If the reply message 178 includes a link to the list 158, the customer may use a browser 169 to assist in accessing the list 158 within a user interface 172 in the display 166 of the client 106.

Data relating to customer history 154 may be stored in a customer account 139 for each customer. Customer history 154 may include data relating to a customer's shopping patterns, purchase history, browse history, items removed, or any other data relating to the habits of the customer. For example, the message shopping application 115 may track the number of electronic messages received from a particular customer and store that information in the customer history 154. Similarly, the message shopping application 115 may track the number of reply messages transmitted to a particular customer and store that information in the customer history 154. This information may be used by the electronic commerce system 121 to ensure security. For example, if the number of electronic messages received by a particular customer exceeds a threshold amount, then the electronic commerce system 121 may be alerted to investigate whether the customer is a legitimate, potential buyer rather than an artificial customer intending to burden the electronic commerce system 121 with repetitive requests.

Figure 2:
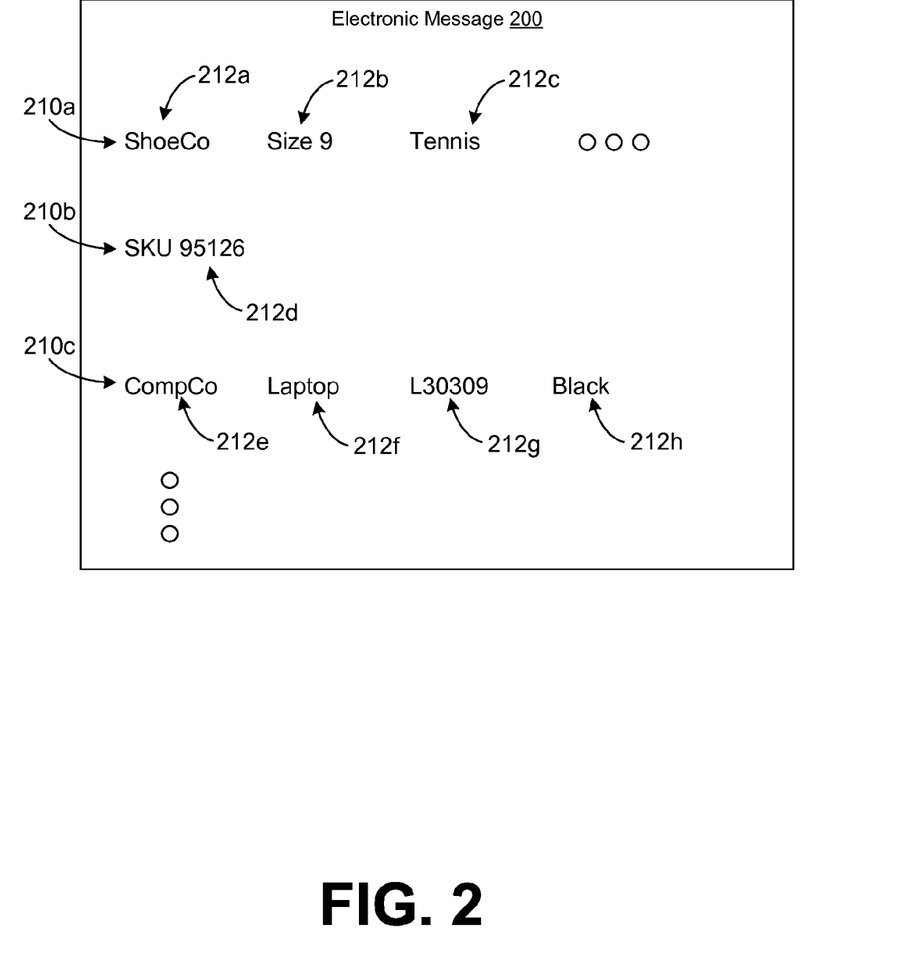
FIG. 2 is a drawing of an example of an electronic message sent by a client in the networked environment of FIG. 1 according to various embodiments of the present disclosure.

Referring next to FIG. 2, shown is an exemplary electronic message 200 sent within a networked environment 100 (FIG. 1). In particular, the electronic message 200 shown in FIG. 2 depicts an example of the format and content of an exemplary electronic message received by a message shopping application 115 (FIG. 1).

Specifically, the electronic message 200 includes three desired items 142 (FIG. 1) for which a customer wishes to shop in an electronic marketplace: a size nine tennis show that is branded by ShoeCo; a notebook with a SKU number of 95126; and a laptop computer that is a black laptop manufactured by CompCo with a model number of L30309. In the example illustrated, the desired shoe corresponds to a first line item 210*a*, the desired notebook corresponds to a second line item 210*b*, and the desired laptop computer corresponds to a third line item 210*c*. Various user-specified attributes 212 may be associated with each line item 210. For example, the customer may describe the desired shoe as a first line item 210*a*, using a brand attribute 212*a*, a size attribute 212*b* and a description attribute 212*c*. Additionally, the desired notebook, described within a second line item 210*b*, may include a SKU number attribute 212*d*. And finally, the desired laptop computer, described as a third line item 210*c*, may include a manufacturer attribute 212*e*, a description attribute 212*f*, a model number attribute 212*g*, and a color attribute 212*h*. It should be appreciated that the electronic message may include any number of line items 210. Furthermore, any line item 210 may include any number of user-specified attributes 212. And also, a particular line item 210 may include any combination of user-specified attributes 212 in any order.

As seen in the following scenario, the electronic message 200 in FIG. 2 demonstrates one example of how a customer may efficiently search for items 142 (FIG. 1) that are sold over an electronic marketplace.

In this scenario, a customer may use a client 106 (FIG. 1) to send an electronic message 200 over the network 109 (FIG. 1) to the electronic commerce system 121 (FIG. 1). The customer, in this example, intends to shop within the electronic marketplace for three desired items 142. The first desired item 142 is a tennis shoe of size 9 branded by ShoeCo. The second desired item 142 is a particular notebook with the SKU number of 95126. And the third desired item 142 is a black laptop computer manufactured by CompCo with a model number of L30309. The customer can describe these three desired items 142 within one electronic message 200. In one embodiment of the present disclosure, each desired item 142 can be described in separate lines of the electronic message 200 using a carriage return to separate each line. After creating the electronic message 200, the customer can use the client 106 to send the electronic message 200 to the electronic commerce system 121 (FIG. 1).

Upon receiving the electronic message 200, the message shopping application 115 may be executed to store the electronic message 200 and to validate the message. The message shopping application 115 may then process the electronic message 200 to identify items 142 corresponding to the desired items 142 described in the electronic message 200. For example, the message shopping application 115 may identify the first line item 210a, the second line item 210b, and the third line item 210c within the electronic message 200, where each of the line items 210a, 210b, 210c corresponds to a desired item 142.

The message shopping application 115 may identify items 142 corresponding to the first line item 210a, the second line item 210b, and the third line item 210c, respectively. In one example, this may be done by searching through items 142 stored in a catalog 130 (FIG. 1). The search may lead to a match where the electronic commerce system 121 identifies a shoe item 142 corresponding to the first line item 210a, a notebook item 142 corresponding to the second line item 210b, and a laptop computer item 142 corresponding to the third line item 210c. Next, the electronic commerce system 121 may include the identified items 142 in one or more lists 158 (FIG. 1) for the customer. Afterwards, a reply message 178 (FIG. 1) is sent to the customer confirming that one or more lists 158 includes the identified items 142 for the customer. Thus, to summarize this scenario, the customer efficiently shopped through an electronic marketplace for a plurality of items 142 by sending the electronic message 200.

The electronic message 200 of FIG. 2. further depicts an alternative embodiment of the present disclosure. In this alternative embodiment, each line item 210 in the electronic message 200 may include one or more attributes. For example, to describe a shoe, a customer may specify a brand attribute 212a, a size attribute 212b and a description attribute 212c. After identifying the first line item 210a, for example, the message shopping application 115 can use the user-specified attributes 212a, 212b, and 212c included in the first line item 210a to aid in identifying a corresponding item 142. Specifically, the message shopping application 115 may identify a shoe item 142 by using the brand attribute 212a, the size attribute 212b, and the description attribute 212c included in the first line item 210a. This is accomplished by searching the attributes 145 (FIG. 1) within a catalog 130 to identify a correlating item 142. In other words, the various user-specified attributes 212a-212h describing the desired items 142 within the electronic message 200 may be compared to the attributes 145 stored within a catalog 130.

The electronic commerce system 121 can determine that the first line item 210a within the electronic message 200 describes an item 142 with a brand of "ShoeCo", a size of "nine", and a description of "tennis." The electronic commerce system 121 may then identify an item 142 within a catalog 130 that matches the user-specified attributes 212a, 212b, and 212c of the first line item 210a such that the item 142 represents a product available for purchase. In this case, the electronic commerce system 121 can identify a shoe item 142 based on the brand 212a, size 212b, and description 212c attributes. The electronic commerce system 121 can then include the identified shoe item 142 in a list 158 for the customer.

When the electronic commerce system 121 identifies the shoe item 142, the electronic commerce system 121 may correlate the first line item 210a to at least one item 142 included in a catalog 130. To accomplish this, the electronic commerce system 121 may employ a matching algorithm or other approaches. Through the use of a matching algorithm, for example, a match score will be assigned based on the strength of the match between an input and an item 142 in the data store 112 (FIG. 1). In one case, the electronic commerce system 121 may find an exact matching item 142. That is to say, the first line item 210a correlates to one and only one item 142 such that only one item 142 is identified for the line item 210a. In one case, if the strength of a match between the first line item 210a and an item 142 in the data store 112 results in a match score that exceeds a threshold amount, then an exact match is signified.

In another case, the electronic commerce system 121 finds a similar matching item 142. As an example, the first line item 210a may correlate to one or more items 142 in a data store 112 such that the match score falls below a threshold amount for each of the items 142, therefore indicating a weaker correlation than in the case of an exact match. When this occurs, one or more items 142 may be included in the list 158 as one or more recommended items. In one example of this case, a similar matching item 142 will be automatically included in the list 158. In another example, a similar matching item 142 will not be included in the list 158 unless a customer takes affirmative action to place the similar matching item 142 in the list 158 through interaction with a user interface 172.

The electronic commerce system 121 may also find no matching items 142. This occurs when the match score is so low that no match exists. Thus, no item 142 is identified by the electronic commerce system 121 and in turn, no item 142 is included in the list 158 (FIG. 1).

Figure 3:
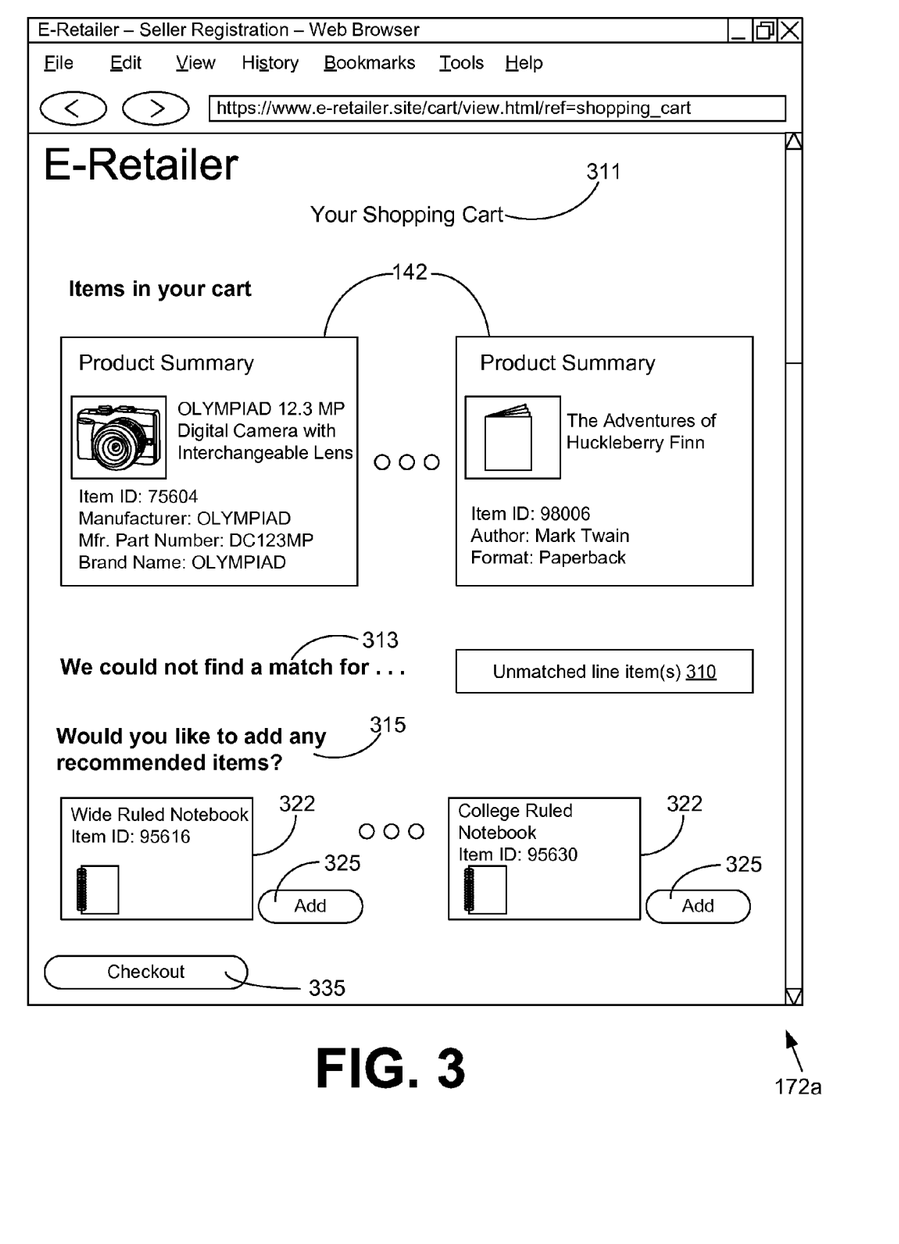
FIG. 3 is a drawing of an example of a user interface within the networked environment of FIG. 1 according to various embodiments of the present disclosure.

Turning now to FIG. 3, shown is one example of a user interface 172 (FIG. 1) denoted hereinafter as user interface 172a. In particular, the user interface 172a expresses the contents of one or more lists 158 (FIG. 1) of a customer account 139 (FIG. 1) for a customer.

The user interface 172a includes a list title 311. The list title 311 may indicate that the user interface 172a expresses the contents of a list 158 that is a virtual shopping cart, a wish list, a registry list, or any other list of the like. Specifically, one or more items 142 may be included in the user interface 172a such that the items 142 are identified by the electronic commerce system 121 (FIG. 1).

In a situation where the electronic commerce system 121 attempts to identify an item 142 corresponding to a line item 210 (FIG. 1) but fails to find a match, a failed attempt indicator 313 may be included in the user interface 172a. The user interface 172a may optionally include text or any other object specifying at least one particular unmatched line item 310. For example, if the electronic commerce system 121 receives an electronic message 200 (FIG. 1) and fails to identify an item 142 corresponding to the second line item 210b (FIG. 2), then the text or object of the unmatched line item 310 section in the user interface 172a may include the text "SKU 95126."

Next, the user interface 172a may include a recommended items indicator 315. For instance, if the electronic commerce system 121 finds at least one similar matching item 142 that corresponds to a line item 210 included in an electronic message 200, then the user interface 172a may include the recommended items indicator 315. This alerts the customer that at least one item 142 has been identified for the customer with the qualification that the similar matching item 142 is not an exact match. Along with the recommended items indicator 315, the user interface 172a may include one or more representations of recommended items 322. The recommended items 322 may be selected from the items 142 in the catalog 130 (FIG. 1). For example, a customer can send an electronic message 200 to the electronic commerce system 121 indicating a desired notebook with a SKU number of 95126, among other desired items 142. The message shopping application 115 may then identify a second line item 210b (FIG. 2) and search throughout a catalog 130 to identify a matching item 142 based on the second line item 210b. If an exact match is not identified, then a similar match might be identified. This similar match may be included in the user interface 172a as a recommended item 322. Additionally, if more than one similar match is identified, each similar match may be included in the user interface 172a as a plurality of recommended items 322.

The user interface 172a may include one or more add buttons 325 corresponding to each recommended items 322, respectively. The add buttons 325 allow a customer to modify the list 158. For example, by clicking on an add button 325, the corresponding recommended item 322 will be included in the list 158. Additionally, the user interface 172a may include buttons to remove items 142 from a list 158. Thus, a customer may modify the list 158 by removing items 142 through the user interface 172a.

A checkout button 335 may also be included in the user interface 172a. The checkout button 335 facilitates an online transaction for the purchase of at least one of the items 142 included in a list 158. Specifically, a customer who clicks the checkout button 335 will purchase items 142 included in the user interface 172a.

Figure 4:
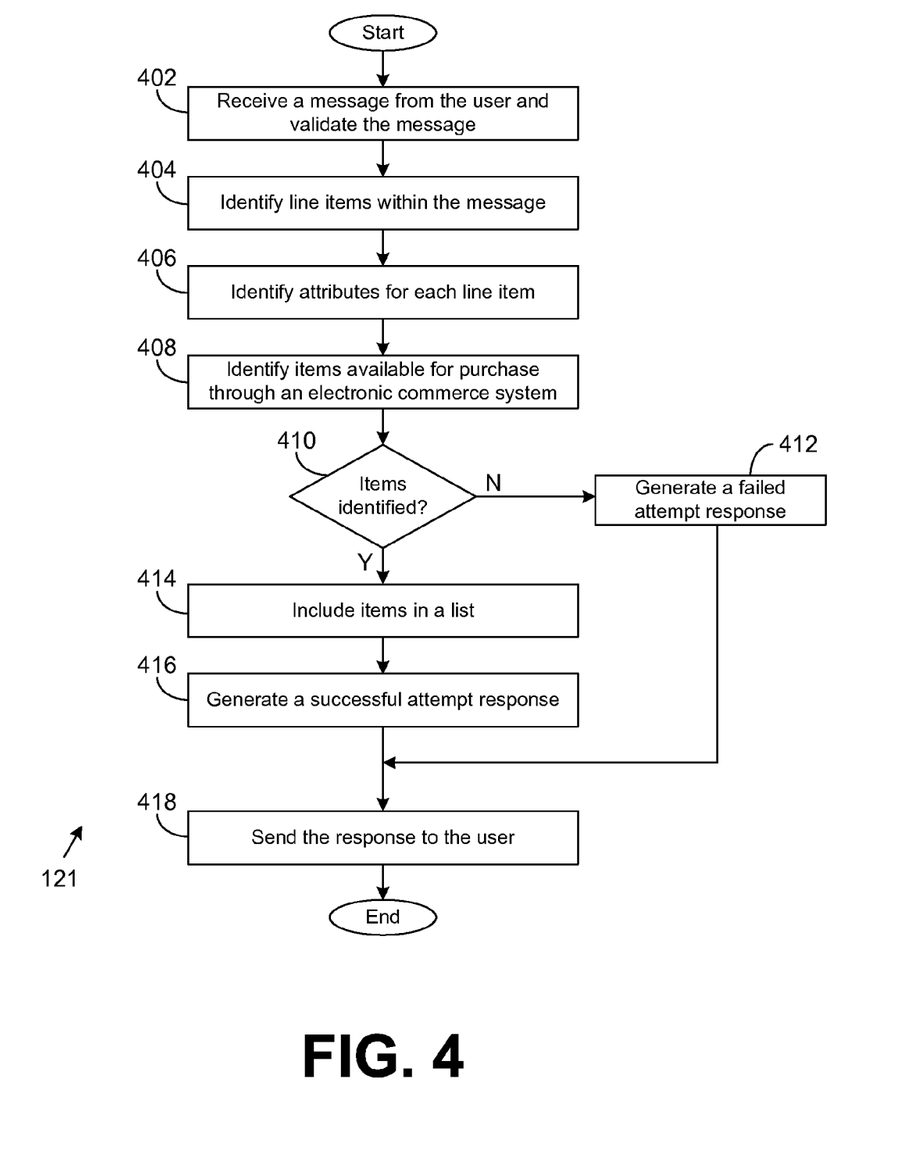
FIG. 4 is a flowchart illustrating one example of functionality implemented as portions of the electronic commerce system executed in a computing device in the networked environment of FIG. 1 according to various embodiments of the present disclosure.

Referring next to FIG. 4, shown is a flowchart that provides one example of the operation of a portion of the electronic commerce system 121 (FIG. 1) according to various embodiments. It is understood that the flowchart of FIG. 4 provides merely an example of the many different types of functional arrangements that may be employed to implement the operation of the portion of the electronic commerce system 121 as described herein. As an alternative, the flowchart of FIG. 4 may be viewed as depicting an example of steps of a method implemented in the computing device 103 (FIG. 1) according to one or more embodiments.

Beginning with box 402, an electronic commerce system 121 receives an electronic message 200 (FIG. 1) from a user and validates the electronic message 200. Specifically, a message shopping application 115 (FIG. 1) executed along with the electronic commerce system 121 may facilitate receiving an electronic message 200 and storing the electronic message 200 in memory for processing. The message shopping application 115 can validate the electronic message 200 by comparing sender information of the electronic message 200, such as an email address or phone number, to information stored in various customer accounts 139 (FIG. 1). This comparison will assist the electronic commerce system 121 in identifying the customer who sent the electronic message 200 and verifying that the customer associated with a customer account 139 (FIG. 1).

Next, in box 404 the message shopping application 115 identifies at least one line item 210 (FIG. 1) within the received electronic message 200. The electronic message 200 may include one or more line items 210 for which a user desires to shop in an electronic marketplace. In box 406, the message shopping application 115 may identify at least one attribute for each line item 210 (FIG. 1).

In box 408, the electronic commerce system 121 attempts to identify one or more items 142 available for purchase though the electronic commerce system 121 for each line item 210. The message shopping application 115 may use the identified attributes in attempting to identify an item 142. For example, the electronic commerce system 121 attempts to identify one or more items 142 (FIG. 1) by searching attributes 145 (FIG. 1) within a catalog 130 (FIG. 1).

In one embodiment of the present disclosure, the electronic commerce system 121 identifies one or more items offered by a particular merchant who is offering the best offer. The electronic commerce system 121 allows a multitude of merchants to sell the same item 142 to customers shopping over the electronic marketplace. The same item 142 may be offered at varying prices by the different merchants. Moreover, in addition to price, items 142 may be offered with different shipping prices. For example, a first merchant may sell a text book for $100 dollars with no shipping fees while a second merchant may sell the same text book for $90 with $20 shipping fees. Thus, the first merchant is offering the best offer when factoring in the cost of shipping. Accordingly, the electronic commerce system 121 may identify the text book item 142 offered by the first merchant because the first merchant is offering the best offer.

When determining the best offer, the electronic commerce system 121 may also weigh other factors based on the merchant such as seller ratings, merchants offering high quality products, merchant return policies, merchant reputation, or any other factor that distinguishes one merchant from another. Thus, in box 408, the electronic commerce system 121 identifies an item within a catalog 130, and then identifies the merchant offering the best offer.

In another embodiment, the electronic message 200 itself specifies one or more preferred merchants. Accordingly, when the electronic commerce system 121 identifies an item 142 available for purchase, the electronic commerce system identifies the item offered by the preferred merchant.

If the attempt to identify one or more items 142 is unsuccessful, as seen in box 410, then the electronic commerce system 121 generates a failed attempt response in box 412. This response will automatically be generated when the attempt to identify is unsuccessful.

However if, in box 410, the attempt to identify one or more items 142 is successful, then according to box 414, the identified items 142 will be included in a list 158 (FIG. 1). In one embodiment, the item included in the list is the best offer. In another embodiment, a successful attempt can include identifying an item 142 for a first line item 210a (FIG. 2) and failing to identify an item 142 for a second line item 210a (FIG. 2). So, as long as the item 142 is successfully identified for any line item 210 within an electronic message 200 (FIG. 2), then the identified item 142 will be included in the list 158. In box 416, the electronic commerce system 121 generates a successful attempt response. This can be done automatically in response to the inclusion of the identified item 142 in the list 158.

In box 418, regardless of whether the attempt to identify an item 142 was successful or not, the response is automatically sent to the user. This notifies the user that the electronic message 200 has been processed by the electronic commerce system 121. In one embodiment of the present disclosure, the response is an electronic message 200 that includes a link to direct the user to a network page.

Figure 5:
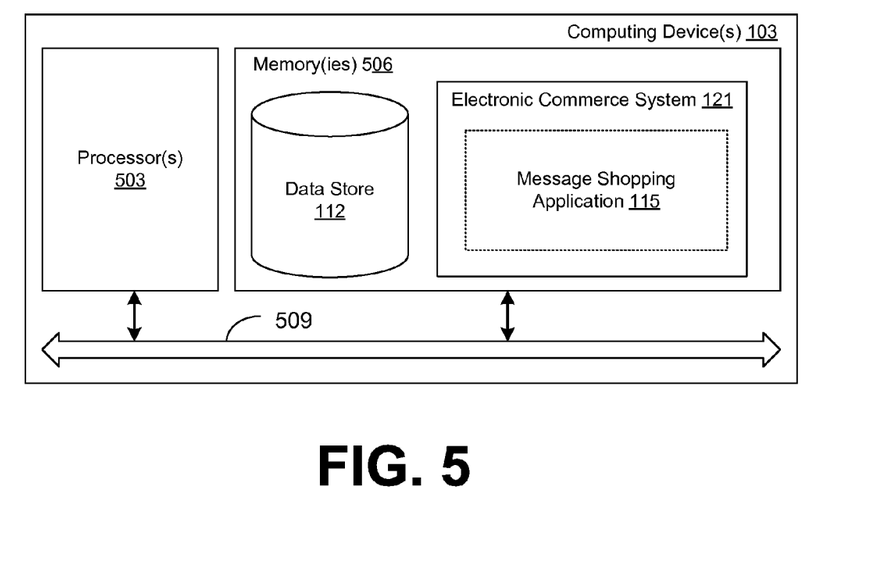
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are electronic commerce system 121 (FIG. 1), message shopping application 115 (FIG. 1), and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although electronic commerce system 121 (FIG. 1), message shopping application 115 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 the functionality and operation of an implementation of portions of the electronic commerce system 121 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in flowchart of FIG. 4 may be executed concurrently or with partial concurrence. Further, in some embodiments, one or more of the blocks shown in flowchart of FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including electronic commerce system 121 (FIG. 1) and message shopping application 115 (FIG. 1) that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
an electronic data store configured to at least store specific computer-executable instructions; and
at least one computing device in communication with the electronic data store, the at least one computing device configured to execute the specific computer-executable instructions to at least:
store an electronic message received from a user, wherein the electronic message includes a line item;
identify the line item within the electronic message;
facilitate a matching of an item to the line item;
include the item in a list associated with a user account for the user, wherein the user account is managed by an electronic commerce system;
automatically transmit a reply message to the user, wherein the reply message confirms that the item is included in the list; and
track a number of reply messages transmitted to the user.

2. The system of claim 1, wherein the electronic message is an email message.

3. The system of claim 2, wherein the computing device is further configured to execute the specific computer-executable instructions to at least:
associate an email address of the user with the user account; and
validate the electronic message received from the user by using the email address.

4. The system of claim 2, wherein the computing device is further configured to execute the specific computer-executable instructions to at least track a number of received email messages associated with the user.

5. The system of claim 1, wherein the list is a virtual shopping cart.

6. The system of claim 1, wherein the line item includes a plurality of attributes.

7. The system of claim 6, wherein facilitating the matching of the item to the line item comprises searching a catalog using the plurality of attributes, wherein the catalog is maintained by the electronic commerce system.

8. The system of claim 1, wherein the line item includes at least one of a Universal Product Code, a stock-keeping-unit number, an International Standard Book Number, or a model number.

9. The system of claim 1, wherein facilitating the matching of the item to the line item comprises determining a best price from a plurality of offers offered by a plurality of sellers participating in an electronic marketplace.

10. A computer-implemented method, comprising:
storing, via a computing device, an email message received from a user in a memory for processing, wherein the email message includes a plurality of line items;
attempting, via the computing device, to identify at least one item corresponding to individual items of the plurality of line items by searching an electronic catalog associated with an electronic commerce system, wherein the at least one item is available for purchase through the electronic commerce system;
including, via the computing device, the at least one item in a list associated with a user account for the user in response to identifying the at least one item, wherein the user account is managed by the electronic commerce system; and
automatically transmitting, via the computing device, a reply email message to the user indicating that the at least one item has been included in the list in response to identifying the at least one item.

11. The computer-implemented method of claim 10, wherein the reply email message includes a link directing the user to the list.

12. The computer-implemented method of claim 10, wherein the list is a wish list.

13. The computer-implemented method of claim 10, further comprising automatically transmitting, via the computing device, the reply email message to the user indicating that attempting to identify is unsuccessful in response to failing to identify the at least one item.

14. The computer-implemented method of claim 10, wherein attempting to identify at least one item corresponding to the individual items of the plurality of line items comprises correlating one of the plurality of line items to a catalog item.

15. The computer-implemented method of claim 14, wherein correlating comprises finding, via the computing device, an exact matching item.

16. The computer-implemented method of claim 14, wherein correlating comprises finding, via the computing device, a similar matching item.

17. The computer-implemented method of claim 10, wherein at least one of the plurality of line items comprises a plurality of attributes.

18. A non-transitory computer-readable medium comprising a program that, when executed by a computing device, causes the computing device to at least:
store an email message received from a user in a memory, wherein the email message includes a plurality of line items;
search an electronic catalog associated with an electronic commerce system to identify at least one item corresponding to individual items of the plurality of line items, wherein the at least one item is available for purchase through the electronic commerce system;
determine that at least one item corresponding to individual items of the plurality of line items has been identified;

in response to determining that at least one item corresponding to individual items of the plurality of line items has been identified,
include the at least one item in a list associated with a user account, wherein the user account is managed by the electronic commerce system; and
transmit a reply email message to the user indicating that the at least one item has been included in the list.

19. The non-transitory computer-readable medium of claim 18, wherein the program, when executed by the computing device, further causes the computing device to at least:
determine that at least one item corresponding to individual items of the plurality of line items has not been identified; and
in response to determining that at least one item corresponding to individual items of the plurality of line items has not been identified, transmit the reply email message to the user indicating that at least one item corresponding to individual items of the plurality of line items has not been identified.

20. The non-transitory computer-readable medium of claim 18, the reply email message includes a link directing the user to the list.

21. The non-transitory computer-readable medium of claim 18, wherein at least one item of the plurality of line items comprises a plurality of attributes.

* * * * *